United States Patent
Slettengren et al.

(10) Patent No.: US 6,898,445 B2
(45) Date of Patent: May 24, 2005

(54) POLITENESS ZONES FOR WIRELESS COMMUNICATION DEVICES

(75) Inventors: Sven Konrad Slettengren, San Diego, CA (US); Alex Krister Raith, San Diego, CA (US)

(73) Assignee: Telefonaktiebolaget LM Ericsson (publ) (SE)

(*) Notice: Subject to any disclaimer, the term of this patent is extended or adjusted under 35 U.S.C. 154(b) by 771 days.

(21) Appl. No.: 09/738,943

(22) Filed: Dec. 13, 2000

(65) Prior Publication Data

US 2002/0028674 A1 Mar. 7, 2002

Related U.S. Application Data

(60) Provisional application No. 60/243,065, filed on Oct. 24, 2000, and provisional application No. 60/231,183, filed on Sep. 7, 2000.

(51) Int. Cl.[7] .............................. H04B 1/38; H04M 1/00
(52) U.S. Cl. .................... 455/567; 455/414.3; 455/419; 455/569.1
(58) Field of Search .................... 455/567, 566, 455/552.1, 569.1, 553.1, 517, 414.3, 414.4, 435.1, 452.1, 456.4, 456.6, 66.1, 419, 417, 420, 550.1, 414.1

(56) References Cited

U.S. PATENT DOCUMENTS

| | | | | |
|---|---|---|---|---|
| 5,479,476 A | * | 12/1995 | Finke-Anlauff | 455/566 |
| 6,011,973 A | | 1/2000 | Valentine et al. | |
| 6,408,187 B1 | * | 6/2002 | Merriam | 455/567 |
| 6,574,471 B1 | * | 6/2003 | Rydbeck | 455/567 |
| 6,615,048 B1 | * | 9/2003 | Hayashi | 455/456.3 |
| 6,658,264 B1 | * | 12/2003 | Irvin | 455/550.1 |

FOREIGN PATENT DOCUMENTS

| | | |
|---|---|---|
| WO | 0876071 A1 | 11/1998 |
| WO | WO99/18745 | 4/1999 |
| WO | WO99/55102 | 10/1999 |

OTHER PUBLICATIONS

Boraks, David, "BlueLinx aims to end mobile phone interruptions" Local Business.com Charlotte–News–http://web1.localbusiness.com/story/0,1118,CLT 209856,00.html (Jun. 28, 2000).

Pritchard, et al., The University of Adelaide 4274 Project Work Politeness Phone Preliminary Report, Thursday, pp. 1–72.

Pritchard J., et al. The Politeness Phone Semester 2 Seminar, 1999.

(Continued)

*Primary Examiner*—Nick Corsaro
*Assistant Examiner*—John J. Lee
(74) *Attorney, Agent, or Firm*—Coats & Bennett, PLLC

(57) ABSTRACT

A communication system includes a politeness zone (PZ); a wireless communication device configured to receive incoming communications over a first communication channel and politeness requests over a second communication channel, the communication device comprising an alerting mechanism configured to indicate receipt of an incoming communication over the first communication channel, the alerting mechanism operable in a politeness mode and a non-politeness mode, the politeness requests indicating that operation of the alerting mechanism should be set to politeness mode, wherein, upon receipt of a politeness request over the second communication channel, the device is configured to accept the politeness request and set operation of the alerting mechanism to politeness mode, or to reject the politeness request and leave operation of the alerting mechanism in its present mode of operation; and a politeness zone transmitter (PZT) configured to send politeness requests to the communication device over the second communication channel when the communication device is proximate the PZ.

42 Claims, 9 Drawing Sheets

OTHER PUBLICATIONS

Ferguson, D., The Politeness Phone, "Interfacing the Handset and the Simulation Program", Semester 2 Seminar, 1999.

Ferguson, D., The Politeness Phone "SIM Toolkit and Future Directions", Semester 1 Seminar 1999.

Reuter, B., The Politeness Phone, Operational Description and Development, CTIN Project.

D'Souza, S., The Politeness Phone, "Stateholder Motivation and Provision by Full Coverage", Semester 2 Seminar 1999.

Pritchard, J., The Politeness Phone, "Bluetooth and Demostration", Semester 1 Seminar 1999.

D'Souza, S. et al., The Politeness Phone, Semester 1 Seminar 1999.

Reuter, B., The Politeness Phone, "Advertising Prospects and Security Aspects" Semester 2 Seminar 1999.

Tognazzini, AskTog "Cellphone Solution in Search of a Champion," http://www.asktog.com/columns/036Cellphones.html, May 2000.

wysiwyg://373/http://www.wired.com/news/technology/0, 1282,37377,00.html; Oct. 4, 2000.

http://www.bluelinx.com, BLUELINX, INC, 2000.

D. Carpenter, "Desperately seeking mobile phone manners" file:///CIWINNT/Profiles/ewusvsl/Desktop/440875.asp.htm, 2000.

* cited by examiner

POLITENESS ZONES FOR WIRELESS COMMUNICATION DEVICES

CROSS REFERENCE TO RELATED APPLICATIONS

This application is related and claims priority under 35 U.S.C. 119(e) to Provisional Application Ser. No. 60/231,183, filed Sep. 7, 2000, and to Provisional Application Ser. No. 60/243,065, filed Oct. 24, 2000, both of which are incorporated by reference herein.

BACKGROUND OF THE INVENTION

1. Field of the Invention

The invention relates generally to mobile communications, and more particularly to systems and methods for instituting politeness zones relating to the use of communication devices.

2. Background

Mobile phone usage in the United States and abroad is increasing at a tremendous rate. It has been estimated that the number of mobile phone users worldwide will increase to one billion by 2003. Moreover, mobile electronic devices, such as laptops and personal digital assistants (PDAs) are integrating wireless transmitters that allow them to act as communication devices. An unfortunate consequence of the increasing number and usage of communication devices is the disruption they cause in restaurants, theatres, classrooms, libraries, etc. To combat this problem, proprietors use signs reminding patrons to to refrain from using their communication devices in certain areas. But signs have a limited effect, and even a well-intentioned patron may forget to turn their communication device off when entering one of these areas. The result is that ringing mobile phones and beeping PDAs annoy surrounding patrons, fellow classmates, etc., and often embarrass the owner of the communication device.

It has been suggested that communication device manufacturers could incorporate transceivers into their products that wold allow transmitters placed in noise sensitive areas to disable the ability of these device to send or receive communications. One problem with this approach, however, is that deployment of such devices will likely be restricted because they will interfere with a user's ability to control his communication device. Another approach is to install transmitters in noise sensitive areas that "jam" incoming communication channels to the communication devices. However, these systems improperly interfere with the operation of the communication systems in which the devices operate and are generally not preferred.

SUMMARY OF THE INVENTION

In accordance with one aspect of the invention, a communication device comprises a first receiver configured to receive incoming communications over a first communication channel, an alerting mechanism configured to indicate receipt of an incoming communication over the first communication channel, the alerting mechanism configured for operation in a non-politeness mode and in a politeness mode, and a second receiver configured to receive politeness requests over a second communication channel, the politeness requests indicating that operation of the alerting mechanism should be set to politeness mode. Upon receipt of a politeness request over the second communication channel, the device is configured to accept the politeness request and set operation of the alerting mechanism to politeness mode, or to reject the politeness request and leave operation of the alerting mechanism in its present mode of operation.

In accordance with another aspect of the invention, A communication system includes a politeness zone (PZ); a wireless communication device configured to receive incoming communications over a first communication channel and politeness requests over a second communication channel, the communication device comprising an alerting mechanism configured to indicate receipt of an incoming communication over the first communication channel, the alerting mechanism operable in a politeness mode and a non-politeness mode, the politeness requests indicating that operation of the alerting mechanism should be set to politeness mode, wherein, upon receipt of a politeness request over the second communication channel, the device is configured to accept the politeness request and set operation of the alerting mechanism to politeness mode, or to reject the politeness request and leave operation of the alerting mechanism in its present mode of operation; and a politeness zone transmitter (PZT) configured to send politeness requests to the communication device over the second communication channel when the communication device is proximate the PZ.

Other aspects, advantages and novel features of the invention will become apparent from the following Detailed Description of Preferred Embodiments, when considered in conjunction with the accompanying drawings.

BRIEF DESCRIPTION OF THE DRAWINGS

The drawings illustrate both the design and utility of preferred embodiments of the invention, in which.

DETAILED DESCRIPTION OF THE PREFERRED EMBODIMENTS

Figure 1:
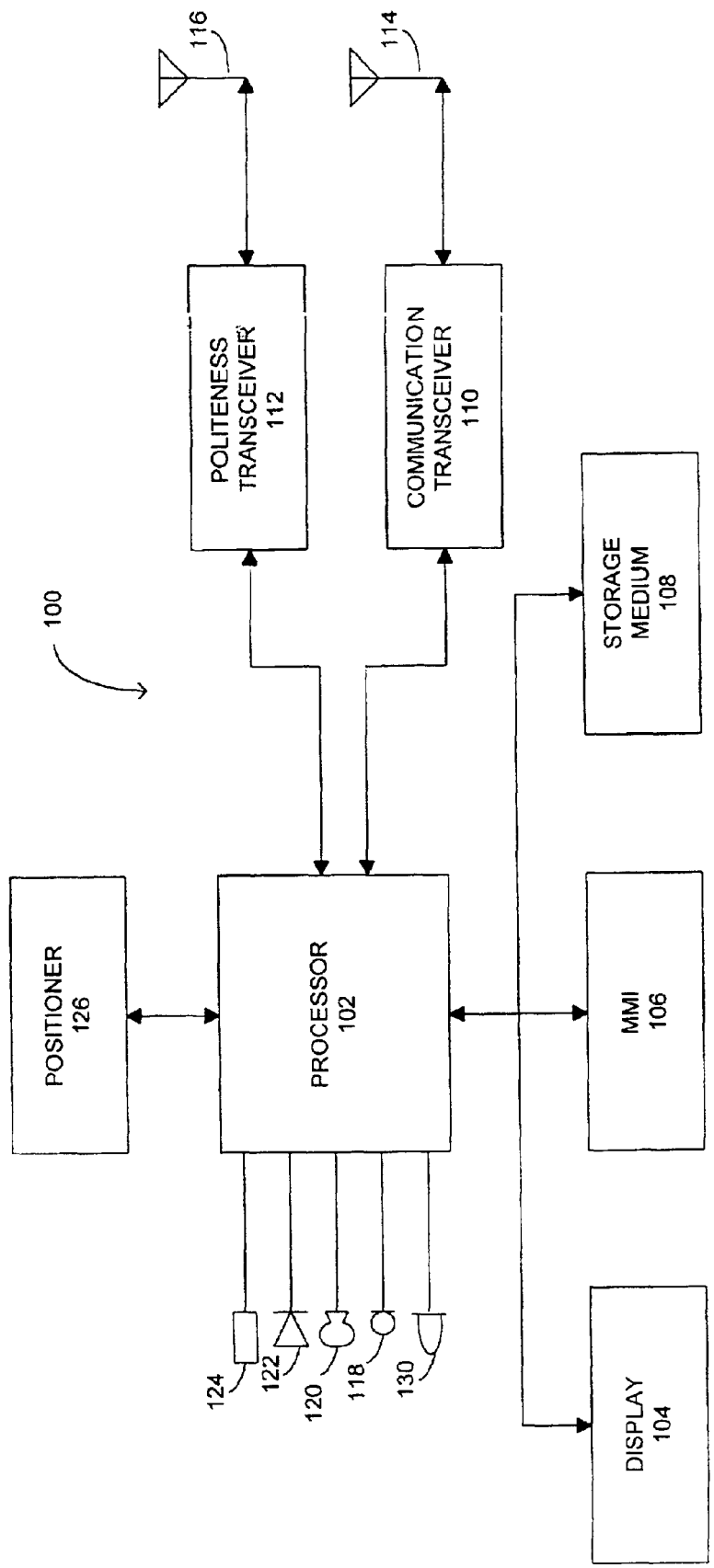
FIG. 1 is a diagram illustrating an exemplary communication device, which incorporates a politeness transceiver in accordance with one aspect of the invention.

FIG. 1 illustrates an example communication device 100 configured in accordance with a general aspect of the invention. The heart of device 100 is processor 102, which controls device 100 and its various components. Device 100 also includes a communication transceiver 110, which communicates over a communication channel with a wireless communication system. The wireless communication system ultimately interfaces device 100 with a public network, such as the Public Switched Telephone Network (PSTN) or the Integrated Services Digital Network (ISDN), or with the Internet.

In a typical embodiment, device 100 is a cellular phone or other device used for wireless voice communication. Wireless transceivers such as transceiver 110 have been incorporated in a variety of devices, however, and therefore device 100 is not limited to any particular type of device. Rather device 100 can be any device capable of communicating over a wireless communication channel controlled by a wireless communication system. For example, device 100 can be a PDA, a laptop computer, or even a pager. Moreover, device 100 is not limited to voice communication. In a typical embodiment, device 100 is capable of both voice and data communication via communication transceiver 110. Device 100 can, however, be limited to data communications, such as in the case of a pager. It is apparent, therefore, that the implementation of transceiver 110 is dependent on the type of device 100 and the type of wireless communication system involved. For this specification, including the claims and drawings, a wireless communication system refers to any system that interfaces and controls communication for a plurality of communication devices over a radio interface.

For voice communication, in a cellular phone for example, device 100 is typical equipped with a microphone 118 and a speaker 120. When initiating a voice communication, the user of device 100 will speak into microphone 118, which will turn the speech into an electrical signal that is coupled to processor 102. Processor 102 will digitize and encode the electrical signal, creating a digital transmit signal that is sent to communication transceiver 110. Communication transceiver 110 modulates the digital transmit signal with a radio frequency (RF) carrier and couples the modulated signal to antenna 114, which will transmit the signal over a communication channel controlled by a wireless communication system in which device 100 operates.

When device 100 is receiving a voice communication, the communication is received by antenna 114 and coupled to communication transceiver 110. Communication transceiver 110 demodulates the communication and generates a digital receive signal therefrom. The digital receive signal is sent to processor 102, which decodes the signal and converts it into a voice signal. The voice signal is sent to speaker 120, which plays it to the user.

Typically, device 100 also includes a display 104 and a man-machine-interface (MMI) 106, such as an alphanumeric keypad. Display 104 is useful for communicating information to the user related to the status of the phone or related to an incoming or outgoing communication. For example, display 104 can include icons that indicate how much battery power is remaining or whether device 100 is "registered" within a wireless communication system. MMI 106 can be used to input a phone number and to initiate a call, or, for example, to scroll through phone directories stored in device 100. In this regard, device 100 includes a storage medium 108, such as a Flash memory, for storing important data such as phone directories. In addition, storage medium 108 stores software used by processor 102. For example, storage medium 108 can store radio control software for controlling communication transceiver 110, communication software for communicating with the wireless communication system, and application software for running the various programs associated with device 100.

MMI 106 and display 104 are also integral components for data communication using device 100. Data communications are handled much the same way as voice communication, however, there is typically no audio to be sent or received. Therefore, the input for the data communication does not come from microphone 118, nor does the output typically go to speaker 120. Instead of audio, the signal received by device 100 comprises information that is typically displayed on display 104. MMI 106 is used to navigate through the data or to select data for display. For example, when device 100 is connected to the Internet through the wireless communication system, data is pulled from, or pushed by, servers on the Internet to device 100. The data is then displayed on display 104. MMI 106 is then used to navigate through the data and to access new data or new sites on the Internet. It should be noted that devices such as device 100 are increasingly incorporating multi-media capabilities that include audio, video, etc. Therefore, microphone 118 and/or speaker 120 will increasingly be used in data communications as well as voice communications.

When a voice or data communication is received by device 100, it is usually signaled to the user via an audible alert. Typically, an incoming communication is signaled using a ringer or buzzer such as buzzer 122. In some embodiments, however, speaker 120 can also be used to alert the user. In fact, many devices 100 store jingles, short tunes, or even portions of popular songs in storage medium 108. The user can then program device 100 to play one of these through speaker 120 as an incoming communication alert. If an incoming communication activates buzzer 120 or initiates the playing of one of these jingles at an inopportune time, however, then it can be quite disruptive. Often, a device 100 will also include a vibrator 124 intended to provide a silent alert. But an incoming communication can be disruptive even when device 100 is using vibrator 124 for the incoming communication alert. For example, when the incoming communication is a voice communication and the user begins conversing with the caller in the middle of a meeting or a movie.

Thus, a general aspect of the invention is to provide systems and methods for implementing politeness zones intended to limit the disruptive effects and usage of communication devices, such as device 100. To this end, device 100 in FIG. 1 includes a politeness transceiver 112 and associated antenna 116. Typically, politeness transceiver 112 is capable of short-range communication as opposed to the long-range communication engaged in by communication transceiver 110. Typically, therefore, politeness zones will use a different, short-range communication channel rather than the communication channel used by communication transceiver 110. A politeness zone preferably uses politeness zone transmitters to communicate politeness requests over the short-range communication channel to device 100 via politeness transceiver 112.

Figure 2:
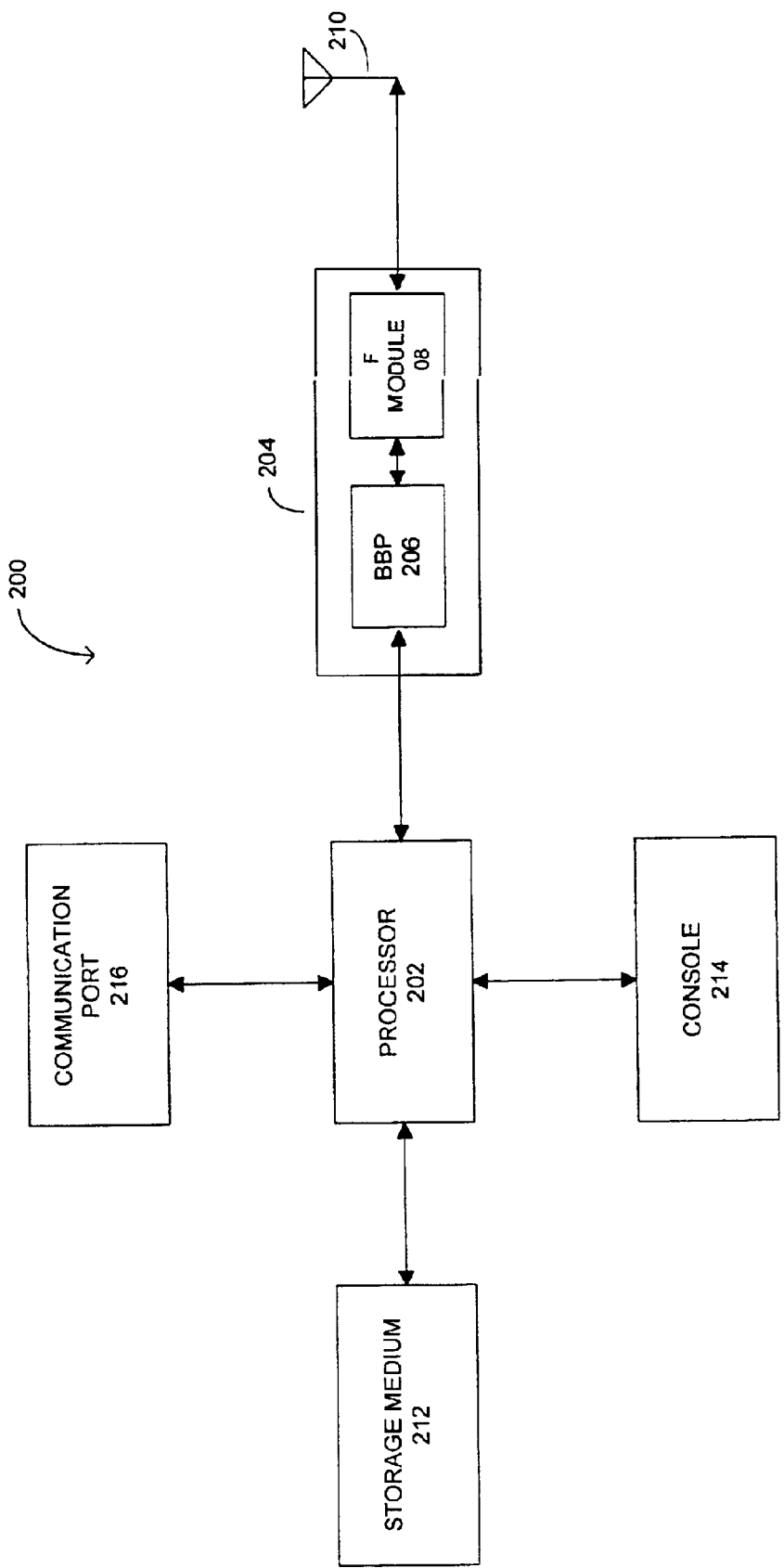
FIG. 2 is a diagram illustrating an exemplary embodiment of a politeness zone transmitter in accordance with another aspect of the invention.

FIG. 2 illustrates an exemplary politeness zone transmitter 200 in accordance with one embodiment of the invention. Politeness zone transmitter (PZT) 200 includes a processor 202, which controls the operation of PZT 200 and the functioning of the various components included in PZT 200. One of those components is politeness transceiver 204. It should be noted that politeness transceiver 209 and politeness transceiver 112 will be substantially the same in any given embodiment. Therefore, the discussion that follows concerning transceiver 204 is equally applicable to transceiver 112. In certain embodiments, politeness transceiver 204 comprises RF module 208 for sending and receiving RF signals over a communication channel via antenna 210, and a base band processor (BBP) 206 that controls the operation of RF module 208. In this case, BBP 206 encodes the politeness requests in the proper format for the communication channel employed in a particular politeness zone. Therefore, BBP 206 can include a separate storage medium (not shown) for storing the communication and radio control software required for communicating over the short-range communication channel. In alternative embodiments, processor 202 performs the function of BBP 206, and storage medium 212 is used to store the short-range radio control and communication software. In a device 1100, if politeness transceiver 112 does not include a BBP 206, then these functions are performed by processor 102 and storage medium 108. Whether BBP 206 is included or not, storage medium 212 is also used to store information related to the politeness zone and the politeness request. This aspect of the invention will be discussed in more detail below.

There are several types of transceivers that can be used for politeness transceiver 204. In fact, any short-range RF transceiver can be used. The choice of transceiver will depend, however, on the protocol used to define the communication channel in the politeness zone. For example, the communication channel used in the politeness zone can use a modified version of the protocol used to define the long-range communication channel used by whatever wireless communication system device 100 is configured to operate in. For example, the protocol used to define the politeness zone communication channel can be a modified version of the GSM, TDMA, or CDMA protocol, as device 100 can be a device configured to operate in any one of these types of wireless communication systems.

Alternatively, transceiver 204, and transceiver 112, can be configured in accordance with one of two communication standards specifically designed for short-range communication. The first is the Bluetooth™ standard as defined in volume 1 of "The specification of the Bluetooth System," which is incorporated herein by reference in its entirety. Bluetooth™ is a universal radio interface that uses frequency hop spread spectrum techniques and operates in the Industrial-Scientific-Medical (ISM) band. Bluetooth™ transmitters are capable of up to 100 mW of transmit power. The second-short range communication standard is the HomeRF™ standard as defined in the shared wireless access protocol (SWAP) specification, which is incorporated herein by reference in its entirety. A HomeRF™ transmitter also operates in the ISM band but uses time division multiple access (TDMA) for voice and time critical services and carrier sense multiple access/collision avoidance (CSMA/CS) for delivery of high speed packet data. A HomeRF™ transmitter is also capable of 100 mW transmit power and can deliver data at 1 Mbs or 2 Mbs. Therefore, certain embodiments of politeness transceiver 112 or 204 can conform to the Bluetooth™ standard and certain embodiments can conform to the HomeRF™ standard. Again, however, the concepts of the invention may also be employed with other short-range, low power radio transceivers. Thus, the above examples should not be seen as limiting the invention to any particular transceiver design.

A politeness zone is an area set up in public or private places to restrict the usage of communication devices in a certain manner according to a set of predefined Politeness Zone (PZ) levels. For example, one embodiment employs three PZ levels:

Level One. Most restrictive—Incoming voice communications are immediately routed to voice mail without any audible indication. Paging modes are restricted to vibration alert only. Users are requested not to originate any communications. They are advised that they are in a PZ level 1 zone when attempting to originate, and are asked if they would still like to proceed.

Level Two. Less Restrictive—Device 100 terminated communications/pages use vibration mode for alerts. Device 100 users are requested to avoid making or answering casual communications.

Level Three. Least restrictive—Device 100 terminated calls use lowest ringer setting or vibrate mode. Users are free to make or accept communications as necessary, but are asked to do so on a limited basis.

The PZs are automatically set up and enforced through the use of PZTs 200 strategically placed in the entrances and/or exits of those settings that require the establishment of such zones. When a device 100 enters a PZ, a PZT 200 will send a politeness request to the device indicating the appropriate PZ level. Whether or not to accept the request, reject the request, or to modify the operation of device 100 independent of the request, is up to the device user. Alternatively, the wireless system operator may program, via a smart card for example, how device 100 responds to politeness requests and the user may be prevented from modifying this programming. In either case, a device 100 has the ability to read the PZ level and modify the manner in which device 100 responds to device 100 originated/terminated communications and pages in a manner appropriate to the PZ level and the specific programming of device 100.

The PZ level can be determined based on several factors. The most basic PZ is one in which the PZ level is a static level enforced at all times. For example, it may never be appropriate to use a device 100 in certain areas of a hospital due to potential interference with sensitive medical equipment. In this case, a PZ can be established that requests level 1 operation of all devices 100 in the PZ at all times. Alternatively, the existence of a PZ can be based on the time of day or day of the week. The PZ level within a PZ can also be adjusted based on the time of day or day of the week, or according to an operation schedule. The existence of a PZ can also be set to coincide with the beginning and/or ending of a particular event. For example, if a PZ is set up in a conference room, then enforcement of the PZ or a change in the PZ level can be scheduled according to the beginning of meetings that are to take place in the conference room.

To facilitate programming of these variables, one embodiment of PZT 200 incorporates a console 214. Information related to PZ operation is then programmed into PZT 200 through console 214. Thus, PZT 200 can be programmed with the required PZ level, the time of day, the day of the week, and operation schedules. Additionally, the desired PZ level programmed into PZT 200 can be static or dynamic based on the time of day or day of the week, or in accordance with a particular schedule. In an alternative embodiment, PZT 200 includes a communication port 216 that can be used to connect PZT 200 to an external device, such as a laptop or palm computer, through a cable or connector. The external device is then used to program PZT 200 for operation. In still another embodiment, PZT 200 is wirelessly connected to an external programming device through transceiver 204. It should be noted that a PZT 200 can include any one or a combination of these programming interfaces.

In addition to transmitting the desired PZ level, a PZT 200 can also be programmed to transmit other attributes related to the PZ. For example, the attributes can include the area of the politeness zone, the location of the politeness zone, the configuration of the politeness zone, the defined entry and exit points of the politeness zone, and/or the type of politeness zone. There can be many zone types. For example, politeness zone types can include restaurant, public transportation, movie theatre, library, conference room, hospital, etc. The attributes can be sent as free form text messages or can be sent as a predefined number in the signaling protocol used by the PZ. The attribute information can then be used by a device 100 in determining what action to take in response to a politeness request. Depending on the programming of device 100, the attribute information as well as information related to the PZ status i.e. accepted or rejected, can be displayed on display 104.

In one embodiment, device 100 includes a politeness control profile (PCP) that controls how device 100 responds to politeness requests. For example, the PCP can be programmed to accept PZ level 1 requests, but reject level 2 and level 3 requests. Alternatively, the PCP can use attributes combined in the request, such as the type of zone, to determine what action to take. For example, if the PZ is a restaurant, then the user can program the PCP to set the incoming communication alert to vibration so that vibrator 124 is activated whenever there is an incoming communication. This way, the user can go outside the restaurant to accept the communication if desired. If, however, the PZ is in a theatre, then leaving to accept the communication is less convenient. Therefore, the user may set the PCP to forward incoming voice communications directly to voicemail, or to store incoming data communications for viewing at a later time. Therefore, the PCP is used to determine what actions to take regarding incoming and outgoing communications when device 100 is in a PZ, regardless of what action is requested in the politeness request. In this way, the user maintains control over the operation of their communication device.

In a typical embodiment, the PCP is used to control how incoming communications are signal to the user. In a mobile phone, for example, there is usually several types and levels of alerts for signaling an incoming communication. There is usually a "ringing" alert with multiple ring volume levels to choose from. Often, there is also a vibration mode and/or a silent alert mode, if the communication device, e.g., mobile phone, includes a visual indicator, such as an LED, then the silent alert can simply consist of some indication from the visual indicator. Thus, a politeness request will often ask that certain alerts or alert volumes be used to indicate incoming communications. The PCP will take into account the politeness request, along with the programming in the PCP, in considering whether or not, and how, to modify the incoming communication alert.

The PCP can be programmed by the device manufacturer or the wireless communication system operator. For example, the PCP may be programmed in the factory when the device is made or later in a service center run by the wireless communication system operator. The system operator can even, in certain embodiments, program the PCP "over the air" using the long-range communication channel. Depending on the embodiment the user may or may not be able to subsequently modify the PCP programming. The PCP is typically stored in storage medium 108; however, in certain embodiments device 100 includes a removable storage medium such as a Flash or SIM card that stores the PCP. This can facilitate faster, more efficient, factory programming, in addition, a removable storage medium can be used by the device user to port the PCP from one communication device to another. This can save the user from potentially burdensome programming and reprogramming of various communication devices.

The PCP can also be used to control how status related to the PZ is displayed to the user. For example, status can be displayed to the user using text or icon messages on display 104. The messages can indicate that the request was received, the PZ level requested, and whether the PZ request was accepted or rejected. Text and iconic indicators can be combined. For example, in addition to displaying a "PZ active" icon, the PCP can be programmed to display a text message telling the user that a PZ request was received and accepted. Additionally, displaying text and/or icon messages can be combined with audible beeps from buzzer 122 and/or patterned blinking of indicator 130. Indicator 130 is typically an LED indicator or the like. In one specific embodiment, an LED indicator 130 is included in antenna 114. In one example embodiment of the invention, different audible beeps or patterns of beeps are used to indicate different PZ level. Similarly, other embodiments use blinking patterns of indictor 130 to indicate different PZ levels. In some embodiments, indicator 130 is capable of outputting multiple colors. In which case, the different colors can be used to indicate different PZ levels. Audible beeps, indicator 130, and display 104 can be used independently or in combination, depending on the embodiment, to alert the user to a PZ and to provide status as to the PZ request.

The PCP can also be programmed with regard to what actions to take when device 100 leaves the PZ. For example, the PCP can be programmed to alert the user to missed communications once device 100 is outside of the PZ. Alternatively, the PCP can be programmed to cause device 100 to automatically dial and access the user's voicemail account to retrieve messages left while the user was in the PZ. Methods of entering and leaving a PZ and the actions surrounding these steps are discussed in more detail below.

It is envisioned that in general the user/device 100 has the ultimate control on how device 100 will respond to a politeness request. However, one or more additional PZ levels can be defined for which the manufacture of the device does not allow the user to determine the response to the politeness request. These levels may be used by venues where no disturbances are tolerated, e.g., an opera house or a hospital. The PCP can be programmed to inform the user with a distinct indication that such politeness level is requested and enforced. This leaves the user the option of not visiting the venue if a very important communication is expected. In another embodiment, the set of special politeness levels may include a mode where voice communication is disabled, but data communication is not effected.

Sometimes a user expects a very important call and wants to prioritize receiving the call over politeness. If the PCP is set to modify the incoming communication alert so that no indication or silent mode is enabled when device 100 receives a politeness request, then the user may want to disable the PCP's ability to accept politeness requests during a specific duration when he is expecting an important call. A user can always modify the content of the PCP; however, this scenario addresses an exception case rather than general handling of a politeness request. This is referred to as PCP by-pass. A PCP by-pass can be accomplished by temporarily changing the effect of the PCP through some MMI 106 action. For example, a special keypad sequence can be used to enter PCP by-pass. The disabling of the politeness action may last for the entire time the user stays in a PZ. In this case, the next time a PZ is encountered, the programming in the PCP will determine the action of the politeness request. Another alternative is that the PCP by-pass is time limited. Thus, the PCP by-pass may be disabled after a specified time, and normal PCP programming returned to, while device 100 is still in the current PZ. The duration of the PCP by-pass can be entered through some MMI 106 action as part of the same action of enabling the PCP by-pass. This later embodiment is useful when the user is not located in a PZ when he determines that he does not want to accept a politeness request. Since the user is not in a PZ, the duration of the by-pass cannot be set for the period the user is in a PZ. For this scenario, a default or user specified time duration for the PCP by-pass addresses is more appropriate.

Additionally, the ability to perform emergency calling must always be possible. If the capability of making outgoing calls is disabled by the politeness request, the device must still recognize a request for an emergency call and allow the call to be made. Therefore, an emergency by-pass must always be included.

The user can also handle certain calls differently than others. Many wireless communication systems use some form of calling line identifier (CLI) to identify the source of incoming voice communications. The CLI can include the calling party's phone number and/or name. In one embodiment, the user can program the PCP to use different incoming call identifiers for different incoming voice communications based on the CLI. For example, the PCP in device 100 can be programmed to use one form of alerting for important callers like family members and another form of alerting for all other callers. The time-of-day can also be combined with the CLI to regulate the incoming call indicator based on the CLI. For example, in one implementation, (luring "night-time" only a limited set of CLIs are indicated using high volume audible alerting, other CLIs get lower volume alerting, and yet other CLIs get no audible alerting. Therefore, the PCP can be programmed to implement politeness mode without input from a PZT. For example, the PCP can be programmed to implement a politeness mode based on the time-of-day, or based on the CLI of an incoming call, regardless of where the device is located.

Ideally, device 100 is also able to receive politeness requests even when device 100 is in "off" mode, because a device 100 may enter a PZ while off. If this occurs, then device 100 will not operate in accordance with the PZ requirements, because it never received the politeness request. Therefore, in one embodiment, the device may have distinct power on/off mechanism for politeness transceiver 112 and a separate power on/off mechanism for the other functions of the device 100. If politeness transceiver 112 is turned on but not the other functions, transceiver 112 stores the politeness request and informs the user of the request if and when the user enables the other functions. When the user does enable the other functions, device 100 checks if there is pending information from politeness transceiver 112. If there is, then device 100 acts in accordance with the PCP. The politeness request can, depending on the embodiment, be stored in politeness transceiver 112 or in storage medium 108 until the non-politeness functions of device 100 are enabled.

To provide the user with increased control over the operation of his communication device, the PCP may be programmed to simply prompt the user to accept or reject a politeness request through some MMI 106 action. This approach is also beneficial for verifying that the PZ is in fact a PZ. In other words, if the user is in an area that one would not normally expect to find a PZ, he can simply reject the politeness request. In another embodiment, however, verification is achieved using a database stored in storage medium 108 that contains the location and identity of each PZ. In this embodiment, the PCP is set to always require MMI 106 intervention when a politeness request is detected and the location of the corresponding PZ is not found in the database. The location of a PZ can be ascertained from location information transmitted with the politeness request. In one implementation, if the user accepts the PZ request even though the location is not in the database, the PCP will add the PZ's location and identity to the database.

As mentioned, the PCP can use the location attributes included with the politeness request to perform the verification. Since verification is geared toward combating fraudulent usage of PZs, however, it is better if the location used is not the one transmitted by the PZ. Rather, in a preferred embodiment, the position is estimated by device 100. Therefore, some embodiments of device 100 include positioner 126, which is capable of estimating the position of device 100. The current coordinates of device 100 are then used as the location of the PZ. Preferably, positioner 126 is a GPS receiver. In which case, the PZ locations are stored in terms of longitudinal and latitudinal coordinates.

In fact, a PZ can be implemented/created using a communication device, such as device 100, that includes a positioner 126, without the use of PZTs. In one embodiment of such a method, the first time the user visits a PZ, he enters through MMI 106 the presence of the PZ. The current coordinates of device 100 are then stored as the location of the PZ. The presence of the PZ can be determined, for example, solely by the device user, e.g., he is in a restaurant and wants his phone to operate in politeness mode, or a proprietor of an establishment may mandate it. Auxiliary information, e.g., the name or other identifier of the PZ (identifiers are discussed below), may also be stored, on a smart card for example, along with the coordinates of the PZ. Next time the current position, according to the positioner, matches any of the stored PZ locations, the PZ mode is enabled. In another embodiment, the operator of the long-range communication system stores all of the PZ locations. The long-range communication system operator then provides a service that PZ proprietors can subscribe to. Under this service, the communication system tracks the location of devices 100 through information provided by positioner 120 during communication between the communication system and device 100. The communication system then transmits the politeness request when device 100 enters a PZ.

For embodiments involving a positioner, the amount of data that is required to store the location coordinates could become large. Often, however, a user visits PZs within a limited geographical area, e.g. a city, with some additional visits far from the area. In order to save memory in the mobile station the location data of the PZ can be compressed, resulting in fewer bits required to define the locations. There are two types of compression. The first is to use any standard compression algorithm compressing the set of stored positions, e.g., the compression algorithm used in V.41bis. When a new location is added to the database, the compressed "file" has to be expanded to its original format (using temporary storage area) and the old data together with the new data is compressed. The second method assumes a reference point. New locations are stored as the difference in two or three dimensions between the reference and the new location. The difference typically requires fewer bits to store than an absolute location, because many locations are within a radius of approximately 1–100 km. For example, most users will typically confine their usage of device 100 to a particular area within a particular city.

The reference point can be generated in multiple ways. The user may define a reference point by MMI 106 action. Alternatively, device 100 may first store absolute positions for each PZ until the memory required to store the locations reaches a specified threshold relative to the amount of memory in storage medium 108 allocated to the database function. When the threshold is reached, device 100 then selects a reference point and converts the absolute locations stored in the database to relative locations. The reference point may be one of the stored absolute locations or could be a point that makes the relative distances to the stored locations as small as possible. Device 100 can also generate more than one reference point. For example, when a user frequently visits two different cities, e.g. San Diego and Los Angles, the locations are clustered around the cities. To minimize the data stored, each city can be divided into a cluster of data for which a reference point may be generated. Absolute locations are stored for PZs outside the cluster areas, because a relative location for these PZs will not result in substantial savings in the amount of stored data required. If the same PZs outside the cluster are frequently visited, then this may later result in a cluster for which a reference point can be generated.

An alternative form of verification is to have the PZ transmit a public key signature to the device. Public key technology for this purpose is described in DIGITAL CERTIFICATE, Jala Feghhi et. Al., Addison-Wesley ISBN 0-201-30980-7, which is incorporated herein by reference in its entirety. The device needs to have means to verify a "signature" of the PZ. Therefore, the signature can include a certificate from a Certificate Authority, such as Verisign, Inc., for example. In one embodiment, the public key of the Certificate Authority is stored in device 100 for verifying the signature. Alternatively, the verification of the signature can be performed over the long-range communication channel. In this case, device 100 communicates, using a data session, for example, with an Authority which can verify the signature. This communication can be performed without any interaction of the user, i.e. the device can initiate the data session itself. If the signature is not properly decoded/verified, the device will not accept the politeness request. If the decoding process indicates proper operation, device 100 will operate according to the PCP. This method requires that the PZ authenticate itself to the Certificate Authority service. The data related to the public key verification process must be entered into each PZT 200 included in a PZ that uses public key verification. Thus, console 214, communications port 216, or transceiver 204 can be used for this purpose.

Potentially related to PZ verification is the function of PZ identification. PZ identification can be used for verification, but more commonly is used to uniquely identify a particular PZ and to identify what type of PZ it is, e.g., school, restaurant, library, etc. There are several methods for identifying a PZ; however, it is desirable that cumbersome ID assignment processes be avoided. Therefore, in one embodiment, the ID is a number within a very large range (many bits) and each ID is assigned in a random fashion. Because the range of numbers is very large, the likelihood of having non-unique ID's is very low. Even if there are some PZs using the same ID, and even if these PZs are within the same geographical area, the consequence is still limited. This is because the operation of a PZ system does not generate a charge to the user. Thus, a faulty identification is not considered catastrophic.

It is also valuable that the PZ type be part of the identification of the PZ. This allows the phone to take the PZ type into account when determining what action to take in response to a politeness request. Therefore, in one embodiment the politeness request will contain the PZ type. This can be accomplished, for example, by including a type identifier in the politeness request. The type identifier can be a PZ type, a number, a name, etc. Additionally, the politeness zone can also include a sub-type identifier if appropriate. For example, the type school may contain sub-types, such as class room, auditorium, food area, sports area, and/or general area. The following is an example PZ identification that combines a random number ID, type identifier, and sub-type identifiers:

Restaurant, take-out, 1010,1100,1101,1001,1110,1000, 0110,0000, Bonilla Empanadas Inc., Isabel's delicious Empanadas.

The example PZ identification includes a type identifier, "Restaurant," and the sub-type identifier, "take-out," which indicates that you may order food to go. The PZ identifier also includes a 48 bit random number ID. With 48 bits, a number randomly selected by the PZ system provider or the manufacture will result in a very low likelihood of having two PZ systems with the same ID within the geographical area visited by a particular user. The example above also includes further sub-type identifiers that specify the name of the restaurant and a product identification. Therefore, in some embodiments, the politeness transmitter can be used to relay information related to a politeness zone to the user in addition to modifying how a device 100 will alert the user to incoming communications. In one embodiment, the user can program the PCP to alert him when certain PZs are entered. For example, using the PZ identifier above, the user can program the PCP to provide a special alert whenever the user is near a Mexican restaurant, or more specifically one that serves empanadas. The Bluetooth™ specification defines methods for Bluetooth™ devices to acquire each others identity that supports the use of names as seen in the PZ identifier example above. Therefore, politeness transceiver 112 and 204 designed in accordance with the Bluetooth™ specification will support the use of such names.

It should be noted that the politeness request can be accompanied by further signaling/messaging between a PZT 200 and a device 100. For example, in one embodiment the politeness request merely indicates the desired PZ level and PZ attributes are communicated in subsequent messages. For purposes of this specification and the claims that follow, the term politeness request refers to all of the signaling from a PZT 200 to a device 100, unless otherwise stated.

In addition to the signaling from a PZT 200 to a device 100, certain embodiments allow for response signaling from a device 100 to a PZT 200. Thus, for example, a device 100 can send a response to a politeness request indicating whether the request was accepted or rejected. Where acknowledgement of this kind is defined in the communication protocol employed by a PZ, PZTs 200 in the PZ can provide feedback to users entering the PZ, and/or administers of the PZ, as to whether the PZT 200 has completed a PZ transaction with a device 100. When the feedback is provided to the user, it can comprise an audible or visual indication at the PZT. This feedback can be combined with feedback that device 100 provides to the user.

The PZT or the PZ system can maintain a log of acknowledged transactions with devices 100, i.e., log-in to PZ and log-out of PZ. This can be used to track statistical events, such as the number of visitors to the venue during a specific time. In one embodiment, the accumulated number of acknowledged requests minus the log-outs can be displayed on PZT console 214 or on an external device interfaced to PZT 200 via transceiver 204 or communication port 214. This can be used to approximate how many user are presently in the PZ. Similarly, if the PZ system uses the timer procedure (as explained elsewhere in this application), the PZ system may decrement the accumulated number of acknowledged requests each time a respective timer has elapsed in order to approximate the number of users presently located in the venue. The remaining number of acknowledged requests as well as timer status can then be displayed on a display included in console 214. An acknowledged request means that a device 100 has properly received the politeness request, not necessarily that each user or device 100 has granted the request. If an application level acknowledgement is included, in addition to a communication acknowledgement, the PZ system can track the approved vs. non-approved requests as well.

The following examples illustrate various sample PZ configurations as well as sample methods for communicating a politeness request to a device 100 entering a PZ and sample methods for how a device returns to normal operation. Again, unless otherwise stated, the term politeness request refers to all of the signaling from a PZT 200 to a device 100 that occurs when the device 100 enters the PZ.

Figure 3:
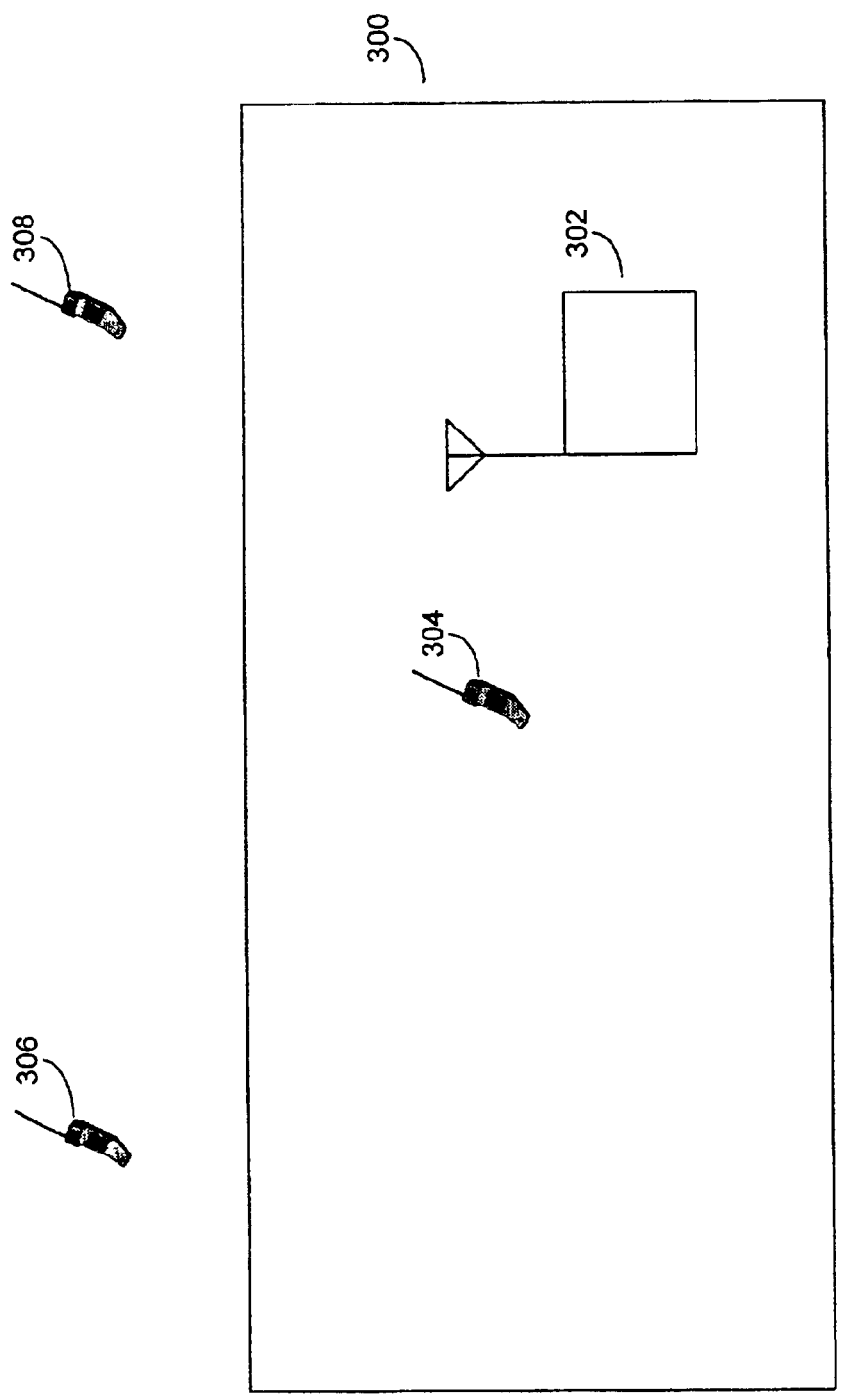
FIG. 3 is a diagram illustrating a first exemplary politeness zone in accordance with still another aspect of the invention.

FIG. 3 illustrates a first embodiment of a PZ 300 in accordance with another aspect of the invention. In PZ 300 there is one PZT 302 and no distinct entry or exit point. PZT 302 interacts with communication devices near PZT 302 to enforce the PZ level desired for PZ 300. In FIG. 3, there is one example communication device 304 in PZ 300, and two example devices 306 and 308 outside of PZ 300. The example devices 304, 306, and 308 are representative only. There can be any number of devices in and/or out of PZ 300. The boundaries of PZ 300 was determined by the communication range of PZT 302. Therefore, PZT 302 will send a politeness request to a device, such as device 304, when the device enters the communication range of PZT 302. Device 304 will then accept the request, reject the request, or modify its operation depending on the programming of device 304.

Figure 4:
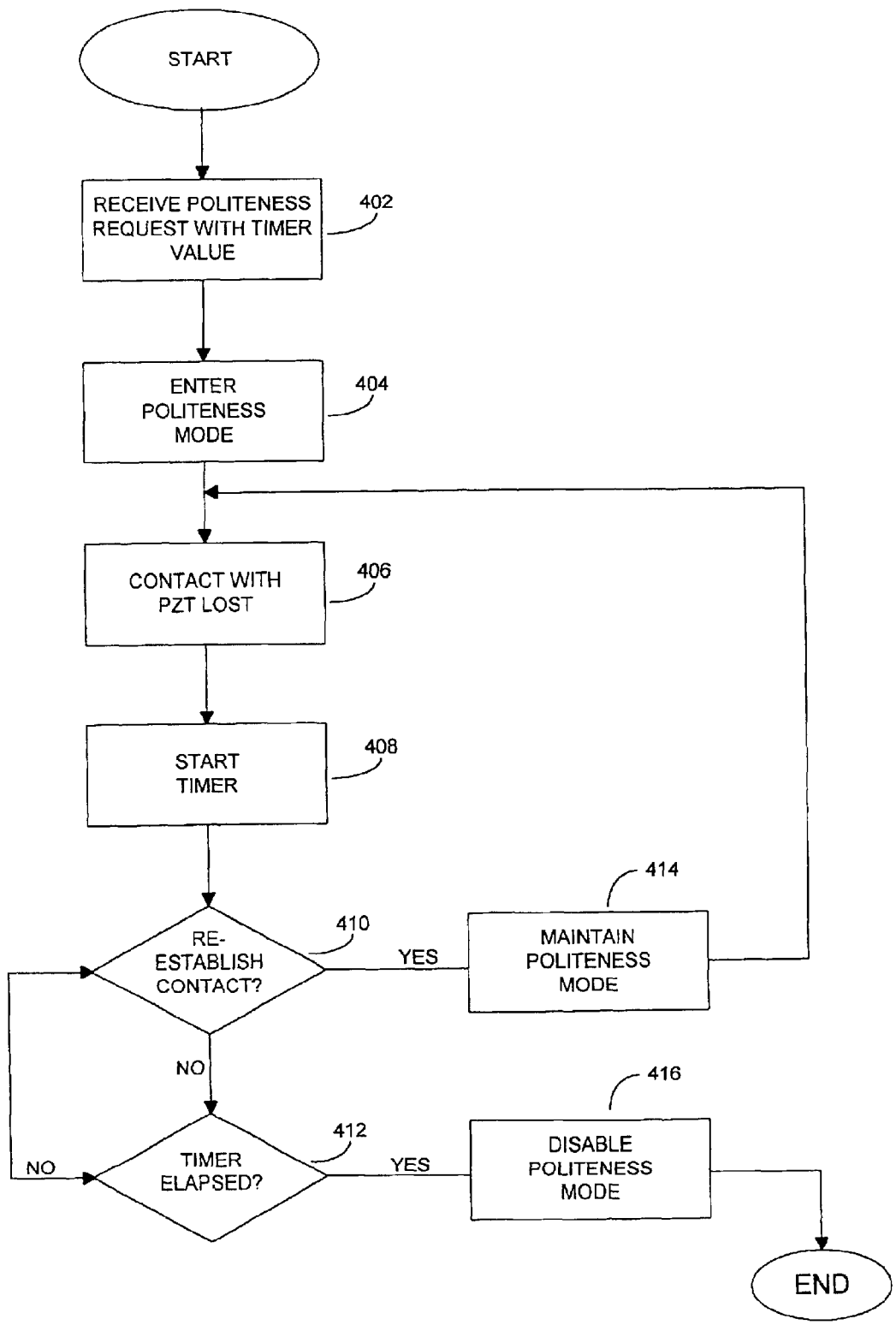
FIG. 4 is a flow diagram illustrating how the politeness zone illustrated in FIG. 3 operates.

How and when device 304 returns to normal operation will then depend on the embodiment of PZ 300. In one embodiment, communications devices, such as devices 304, 306, and 308 include a timer (not shown). The timer can be implemented in either software or hardware and can be a dedicated timer or a timer that is also used for other device functions. A device, such as device 304, will then use the timer value to determine when to return to normal operation. FIG. 4 illustrates, with reference to device 304, a method of using a timer value to determine when device 304 will return to normal operation. Thus, in step 402, device 304 receives a politeness request that includes a timer value from PZT 302. In order to receive the request, device 304 must be within the communication range and establish communication with PZT 302. This can be accomplished in several ways. One way to establish communication between device 304 and PZT 302 is for PZT 302 to establish a communication link with device 304. PZT 302 passes the politeness request and timer value once the communication link is established. PZT 302 establishes the communication link in accordance with the communication protocol used in PZ 300. For example, if device 304 and PZT 302 use Bluetooth™ transmitters, then communication links are established in accordance with the Bluetooth™ standard. The communication link can also be used for communication from device 304 to PZT 302.

In step 404, device 304 enters politeness mode. This, of course assumes that device 304 is programmed to accept the politeness request. In actuality, device 304 can also reject the politeness request or modify its behavior in a manner that is independent of the politeness request. Device 304 remains in politeness mode as long as the communication link is maintained. When contact with PZT 302 is lost (step 406), the timer in device 304 is started (step 408) and set to run for the timer period passed to device 304 by PZT 302. If contact, i.e., the communication link, is re-established (step 410) before the timer has elapsed (step 412), then device 304 remains in politeness mode (step 414). If, on the other hand, the timer has elapsed before contact is re-established, then device 304 returns to normal operation, i.e., politeness mode is disabled (step 416).

In another embodiment, The user can clear the politeness mode, i.e., disable politeness mode, through some MMI action. This is of most convenience when the user exits the PZ before the timer expires. Furthermore, the user may increase the value of the timer (re-charge) if he stays within the PZ longer than the initial timer value. When the timer is about to expire, a low attention alerting, e.g., enabling a vibrator or flashing graphics on a display, may alert the user to option of re-charging the timer. The recharging may be accomplished by a pre-determined MMI action resulting in a predetermined set of time added to the timer. In one embodiment, the timer data is always displayed on a display included in device 304, or alternatively, the user can always access the timer data through some MMI action and cause it to be displayed. The timer data can, for example, include both the total time and the remaining time, e.g., 200 min; 65 min, or simply one or the other.

If the number of communications devices in PZ 300 becomes large, the ability of PZT 302 to maintain a communication link with each of them can be impacted. For example, in the Bluetooth™ specification, communication is achieved through the formation of piconets. Bluetooth™ units that are within range of each other can set up a connection to form piconets on an ad hoc basis. To regulate traffic over the connection, one of the participants becomes a master of the piconet. Typically, the unit that establishes the piconet assumes the role of master. For example, PZT 302 can serve the role of master in PZ 300. The communication channel used by the piconet is divided in time, with each unit in the piconet assigned one time slot for transmitting data and one time slot for receiving data. The master then polls each slave for any data to be transmitted by the slave. If the slave has data to communicate, then the slave will send the data in a time slot immediately following the poll from the master. A clock inside the master (not shown) controls communication timing for the whole piconet. Each unit, however, has its own free-running, native clock (not shown) as well. When a connection is established, a clock offset is added to synchronize the slave native clocks with the master clock. But the native clocks are never adjusted and the offset is used solely for the duration of the connection.

A piconet consists of up to eight Bluetooth™ units. Therefore, PZT 302 can maintain a communication link with only seven communication devices. To overcome this limitation, multiple PZTs can be employed. Alternatively, PZT 302 can use a broadcast mode, i.e., non-addressed messages and no communication link procedures. In a broadcast system, PZT 302 broadcasts the politeness request periodically. As long as a device such as device 304 can receive the broadcast, it stays in politeness mode. If device 304 cannot receive the broadcast, then the timer is set. If device 304 does not receive a broadcast before the timer expires, then device 304 returns to normal operation. A broadcast system is really only suitable, however, in embodiments that do not, or are not able to, allow for device 304 to respond to the politeness request. This is because, there is not communication link established between device 304 and PZT 302. Therefore, there can be no communication from device 304 to PZT 302. It is possible, however, to combine broadcast mode communication and two-way communication over an established link between PZT and device 304. For example, certain information can be broadcast, while a link is established to communicate other information.

Alternative embodiments of PZ 300 can be implemented without the use of the timer. In other words, as long as device 304 remains in contact with PZT 302, or is able to receive a broadcast signal from PZT 302, device 304 assumes that it is in PZ 300. When device 304 is no longer in contact with, or able to receive a broadcast from, PZT 302, then it assumes it has exited PZ 300. Additionally, in some embodiments of PZ 300 the timer will start as soon as the politeness request is received, whether PZ 300 is using broadcast mode or communication links.

In another example embodiment, device 304 includes a positioner (not shown), such as a GPS receiver. PZT 302 passes coordinates defining the area of PZ 300 with the politeness request. Device 304 periodically checks its position, using the positioner, against the coordinates provided by PZT 302. If device 304 determines that it is outside of PZ 300, within some margin of error, then device 304 assumes that the politeness mode is disabled. In order to save power consumption in device 304 due to the activity of the positioner, the frequency with which the positioner updates its position can be based on the proximity to PZT 302 in order to avoid an unnecessary high update frequency. Because the operation of the positioner increases the current drain of device 304, it may not be desirable for the positioner to operate continuously. Other position related applications, e.g., emergency calling, may only activate the positioner upon request, by a user command or indirectly by the user when enabling an application which utilizes the position of device 304. Thus, if other usage of the positioner only requires infrequent position updates, the current drain of the positioner required to support the PZ function can have a large impact on the overall device 304 power consumption.

Therefore, in one embodiment, when the positioner indicates that device 304 is close to a previously located PZT (or PZ), device 304 may request that the positioner update the position with a decreased measurement frequency. This is because there is a high probability that device 304 is in PZ 300, for example, when the positioner indicates that device 304 is close to PZT 302. Therefore, device 304 does not need to check its position as often in order to determine if it is still in PZ 300. When the positioner indicates that device 304 is farther away from PZT 302, the frequency with which the positioner updates the position is increased, because it is more likely that device 304 has exited PZ 300. Thus, the frequency of position update becomes a function of the distance to the closest PZT of interest. In a further embodiment, the frequency of the position updates is dependant on the rate of change of position (speed) in addition to the last reported position. For example, if the last n position estimates are very close, with respect to each other and within the measurement accuracy of the positioner, and device 304 is close to PZT 302, then the frequency of position estimates can be set to a lower value. In general, the frequency of position estimates can be stated as: freq=$f$ (distance,speed), where $f$ is a mathematical function.

Also, The format of the location information can take various forms, such as a single position, a single position and radius, or multiple positions hypothetically connected by straight lines. The formats can even be augmented by a height over sea level or similar reference point. This may add precision for a smaller PZs located in a high-rise building. Thus, the argument "distance" in the function $f$ can be computed three-dimensional. A timer can also be integrated into an embodiment that uses a positioner to determine if device 304 is in a PZ. In this type of embodiment, device 304 can in the interest of minimizing power consumption, totally disable the positioner. This assumes that no other application residing or connected to the mobile station require and that device 304 is relatively close to PZT 302. A timer, the value of which can be determined as a function of distance to PZT 302, can then be set. When the timer expires, the positioner is requested to deliver a position estimate.

In embodiments which do not employ a PZT, i.e., where a PZ is determined through some MMI action that causes the device 304 to store its current position as the location of a PZ, increased position update frequency is required as device 304 is close to the PZ. This is because device 304 must update its position to check if it has neared or, in fact, entered a previously stored PZ. In other words, when device 304 is far away from a PZ, it does not need to update the frequency as often, because it is not likely to be in the PZ at a given time; however, as device 304 nears a PZ, the position update frequency needs to be increased so that device 304 is sure to enter politeness mode when required. In this case, the relationship between freq and $f$ in the above equation will be the inverse with regard to distance and speed. It should also be noted that embodiments including a PZT may also use increased position update frequency for close distances. The exact implementation of $f$ will depend on the desired attributes and requirements of the particular embodiment.

Figure 5:
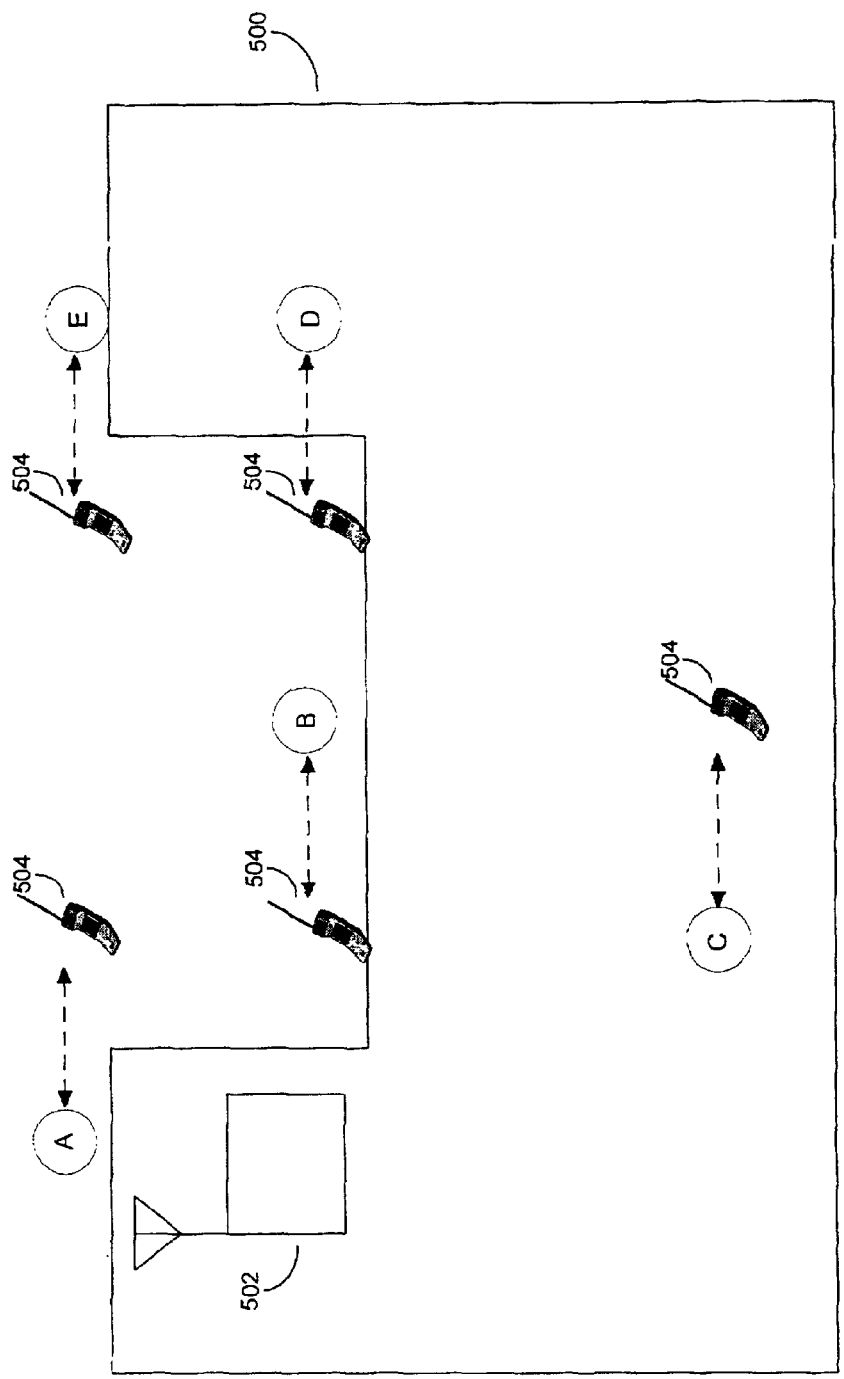
FIG. 5 is a diagram illustrating a second exemplary politeness zone in accordance with yet another aspect of the invention.
Figure 6:
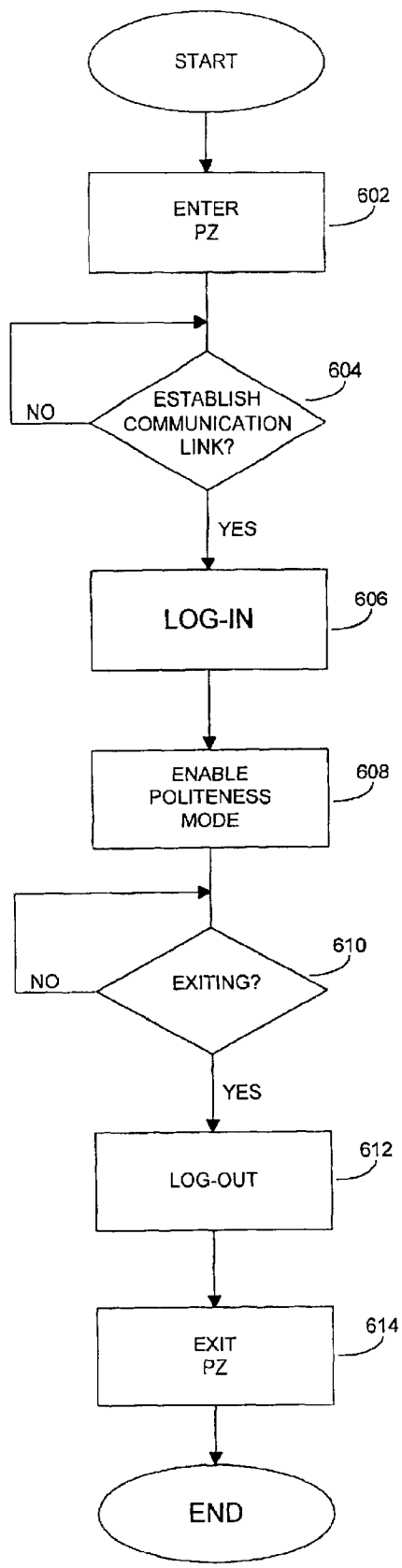
FIG. 6 is a process diagram illustrating how the politeness zone illustrated in FIG. 5 operates.

There are distinct entry and/or exit points in other example PZ embodiments. For example, FIG. 5, illustrates an example embodiment in which there is a distinct entry that also serves as the exit to PZ 500. Positioned at the entry/exit is a single PZT 502. FIG. 6 is a flow chart that illustrates how a device 504 receives a politeness request from PZT 502 and then returns to normal operation. The steps in FIG. 6 refer to positions A, B, C, D, and E in FIG. 5. First, in step 602, device 504 is outside of PZ 500 (position A). As device 504 passes PZT 502, a communication channel is established by PZT 502 with device 504 (step 604). Once the communication channel is established, PZT 502 sends a politeness request to device 504 along with a log-in message in step 606 (position B). In step 608, device 504 enables politeness mode in response to the politeness request and enters PZ 500 (position C). Of course, device 504 can reject the request or modify its behavior independent of the request.

Device 504 will remain in politeness mode as long as it is in PZ 500. In step 610 device 504 begins to pass through the exit on its way out of PZ 500 (position D). As it passes PZT 502, a communication channel is again established (step 612) and PZT 502 sends a log-out message to device 504. When device 504 receives the log-out message, it assumes that it has exited PZ 500 and disables politeness mode. In step 614, device 504 has exited PZ 500 (position E). In this scenario, the log-in and log-out messages are inherent, because the PZT does not know if device 504 or is entering or leaving.

In one embodiment, the politeness request contains the ID of PZ 500 and an indication that PZT 502 is at a combined entry/exit. This serves as the log-in. Device 504, then losses contact with PZT 504 as it enters PZ 500. When device 504 is exiting, it will encounter PZT 502 again and receive the ID and entry/exit information. Device 504 will then assume it is exiting, i.e., regaining contact with the same PZT will serve as an inherent log-out. It should be noted that steps may need to be taken to prevent a log-in message from erroneously reaching devices outside of PZ 500, or log-out messages from erroneously reaching devices still in PZ 500. The problem of erroneous enabling and disabling of politeness mode is dealt with in detail below, as is the problem of confining the RF transmission of PZTs. In alternative embodiments, PZ 500 can implement the timer-based approach discussed with regard to PZ 300 illustrated in FIG. 3.

The use of Bluetooth™ transmitters creates an issue. In the embodiment discussed above, PZT 502 must communicate with entering and exiting devices. This can present a problem since PZT 502 will be limited to communication with only seven devices at a time. The amount of communication that must be transmitted from PZT 502 to device 504 is minimal, however. This process does not take much time relative to the time a device is within range of PZT 502. Therefore, this is not typically an issue. But if the piconet capacity restraint is an issue, then a timer-based approach is probably a better solution. Moreover, both methods can be used simultaneously, i.e., a log-in message is sent along with a timer value. That way if device 504 does not receive the log-out message, because PZT 502 is already communicating with seven other devices, then expiration of the timer will cause device 504 to disable politeness mode. When the timer is used as a back up in this way, a relatively longer time period is typically used.

Figure 7:
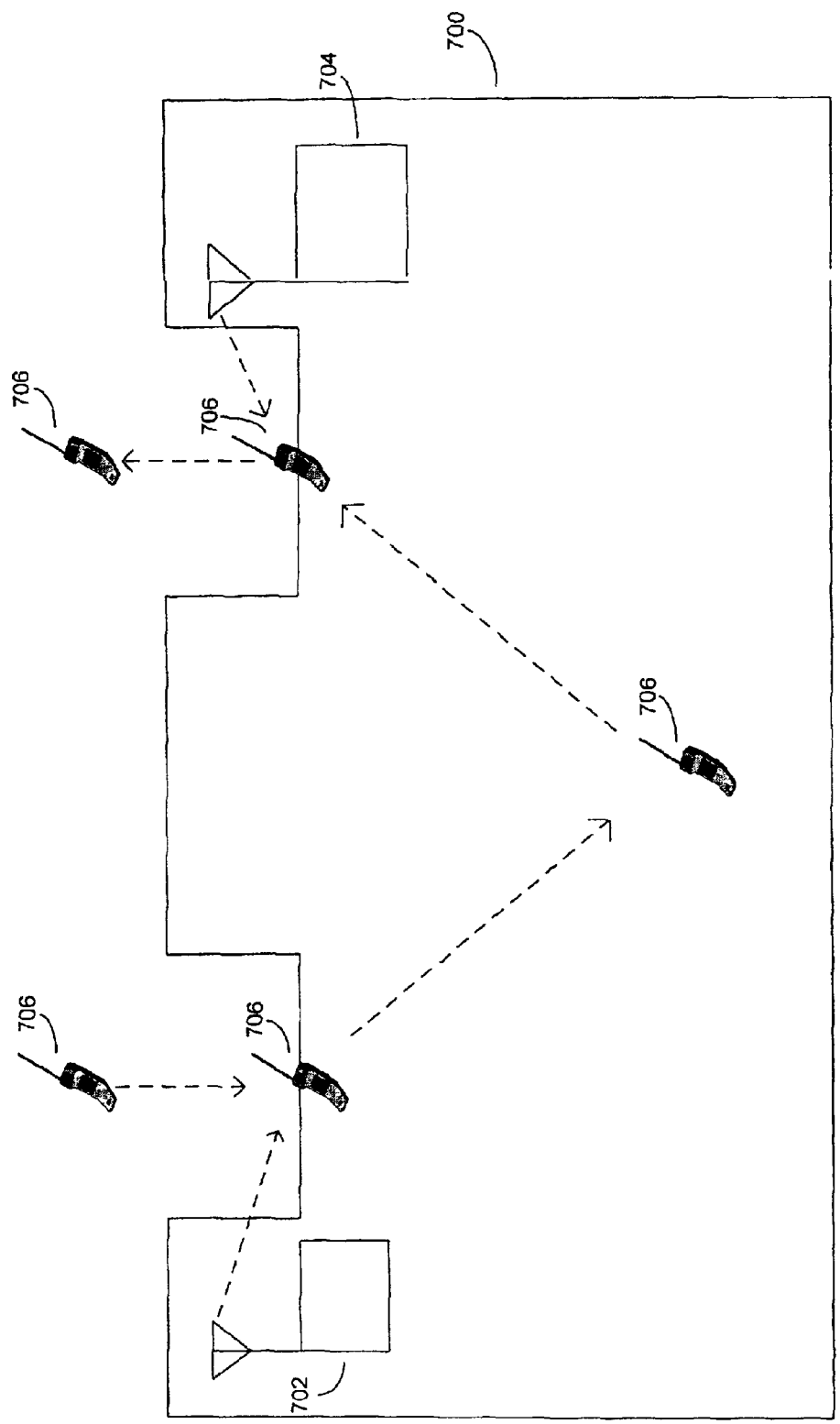
FIG. 7 is a diagram illustrating a third exemplary politeness zone in accordance with a still further aspect of the invention.

FIG. 7 illustrates another example PZ embodiment in which there are distinct entries and distinct exits. For ease of illustration, PZ 700 is shown with one distinct entry and one distinct exit, but there is no limit on the number of distinct entries and exits that PZ 700 can have. A PZT is stationed at each distinct entry and each distinct exit, i.e. PZTs 702 and 704 in FIG. 7. The process for enabling and disabling politeness mode is essentially the same as discussed with regard to the process illustrated in FIG. 6; except, the log-in and log-out messages are sent by different PZTs as opposed to single PZT 502 handling both functions. Therefore, each PZT will know if a device is entering exiting, which was an issue relating to the operation of PZ 500.

In one embodiment, PZT 702 also sends a configuration of the entry and exit points to device 706. Device 706 will then assume that it will receive a log-out when leaving. Therefore, a timer-based approach is probably not needed, but a timer can still be used as a back up. The configuration information sent by the PZT can be in various formats. In one embodiment, it comprises informing the device that the current PZ has distinct entry and exit points. In another embodiment, the configuration information comprises coordinates for the PZ and possibly for the locations of the entries and exits as well. Embodiments that deal more specifically with handling coordinate information are discussed elsewhere in the application.

Figure 8:
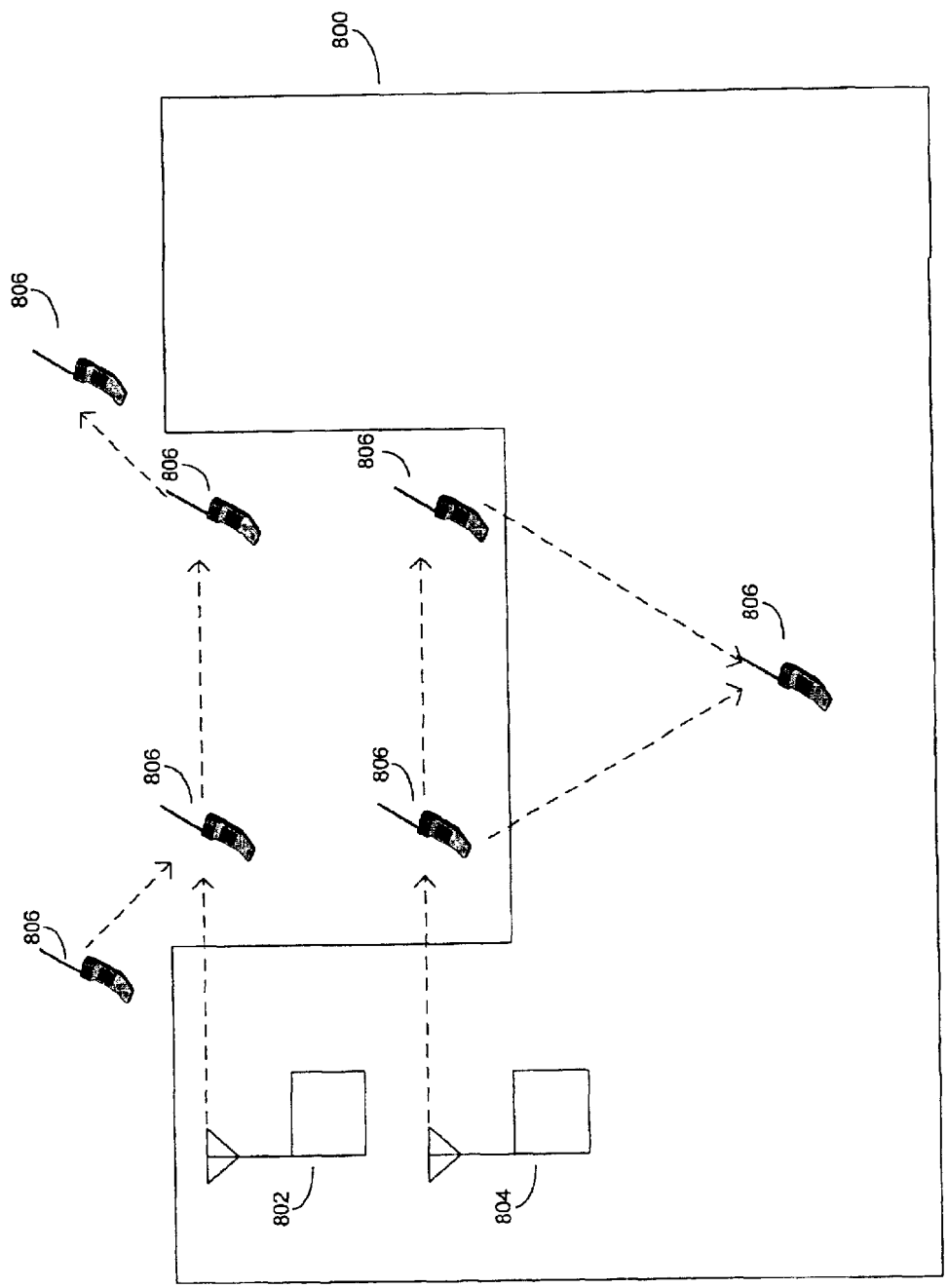
FIG. 8 is a diagram illustrating a fourth exemplary politeness zone in accordance with yet another aspect of the invention.
Figure 9:
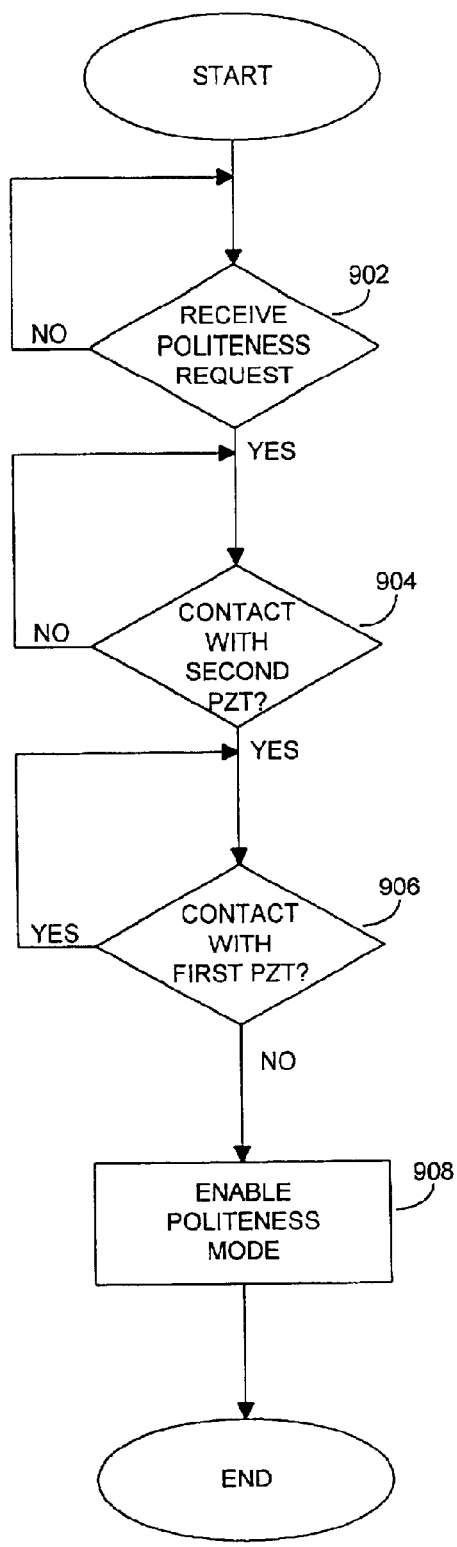
FIG. 9 is a process diagram illustrating how the politeness zone illustrated in FIG. 8 operates.

FIG. 8 illustrates another example PZ embodiment that comprises multiple PZTs at the entry/exit. Essentially, as a device 806 enters PZ 800, it first establishes communication with PZT 802 and then PZT 804. The combined communication with PZTs 802 and 804 will cause device 806 to enable politeness mode. FIG. 9 is a flow chart that illustrates an example process for how this can occur. First, in step 902, device 806 enters PZ 800 and receives a politeness request from PZT 802. After receiving the request, device 806 then establishes contact with PZT 804 in step 904, while still maintaining contact with PZT 812. Eventually, device 806 will lose contact with PZT 802 (step 906), at which point it will assume it has entered PZ 800 and enable politeness mode (step 908).

Alternatively, device 806 can assume that it has entered PZ 800 and enable politeness mode, upon receiving the politeness request from PZT 802 or upon establishing contact with PZT 804. Alternatively, device 806 can wait until it has lost contact with PZT 804 before enabling politeness mode.

When device 806 exits PZ 800, it will then encounter PZTs 802 and 804 in reverse order, indicating to device 806 that it is exiting PZ 800. Depending on the embodiment, device 806 can assume it has exited PZ 800 upon making contact with PZT 804, upon making contact with PZT 802, upon losing contact with PZT 804, or upon losing contact with PZT 802. There can also be more than two PZTs to make the protocol even more robust, or to increase the coverage area, but two PZTs is considered adequate for most applications. In a typical embodiment, the signaling between PZTs 802 and 804 and device 806 will include information that informs device 806 it has entered a PZ of the configuration that is illustrated by PZ 800. For example, the signaling from PZT 802 will include the type of PZ, the number of PZTs, and which PZT the signaling is coming form. The signaling, therefore, can be in the following format: Multiple, 3, A. Where multiple means multiple PZT configuration, 3 means that there are three PZTs in use, and A means that the signal is coming from the first of these three PZTs. Thus, the signal from the next PZT will be Multiple, 3, B, and so on. When device 806 exits, it will receive the signals in reverse order. Thus, device 806 can easily determine that it is exiting. Whether the PZ is configured like PZ 800 or not, signaling that informs the device of the configuration of the PZ is still communicated.

Due to the difficulty of predicting the radio propagation of a PZT transmit signal, the signal may reach outside the intended coverage area. If the PZT signal extends beyond the intended bounds of a PZ, then, for example, politeness mode in communication devices belonging to people walking by a shop or a restaurant can be inadvertently enabled. One solution is to reduce the power of the PZT. However, this may result in coverage holes inside the intended coverage area, i.e., areas within a PZ that the PZT signal does not reach. To adjust for such holes, multiple PZTs with reduced output power can be used to replace one PZT operating at full power.

Another approach is to strategically place the PZT such that the radiated energy is directed to the intended coverage area and avoids "leaking" into other areas, i.e., outside the PZ. One way to accomplish this is to use a directional antenna, which the housing (casing) of the PZT can provide. For example, a PZT can be placed on the wall above an entrance door to a restaurant facing into the restaurant. The casing can be designed to provide a directional effect on the emitted radio energy, with a relative lower amount of energy going the other direction. Furthermore, a PZT is typically mounted on a wall, and the wall will provide additional attenuation of the PZT signal. A dedicated shield, such as a thin metal film can also be provided on the wall to further attenuate the signal going into the wall. The combination of power level, directional effect of antenna system, and additional shielding are means to confine the radio energy to intended areas.

After applying careful consideration to the location, power level, the number of PZTs, and the shielding, the configuration can be tested. This can be done by having a RF power level measurement device. Alternatively, a communication device equipped to handle the PZT signal can be used. By walking around inside and out side the intended coverage area and monitoring the indications provided by the device, the whole configuration can be tested.

If after applying the techniques above, there is still a concern that the PZT signal reaches outside the intended coverage area, and replacing a distinct PZT with multiple PZT is considered to be to costly, an additional technique can be applied. In order for people walking by a restaurant, for example, not to have their devices affected by PZTs of the restaurant, a delayed lock-on technique can be applied. The delayed lock-on technique delays the enabling of politeness mode or the presentation of a message to the user asking the user to accept the politeness request.

There are two ways of implementing the delayed lock-on. First, the communication device can, according to its PCP for example, always introduce a delay. Second, the communication device may use signaling information provided by the PZT to determine whether a delayed lock-on should be applied. The signaling could be a simple indication to employ a predetermined amount of delay time or the delay time can be included in the signaling. Whether to actually apply the indicated delay time can be based on the identity (ID) of the PZ as compared with previously stored IDs in the PCP, or the type of PZ according to the signaling, e.g. library, school, etc. If the ID is not recognized, the preferred implementation is to apply the delay lock-on technique. If the ID is recognized, it is likely that the user will enter the PZ and no delay is necessary.

A delayed lock-out feature when disabling the politeness mode can also be applied to avoid a "Ping-Pong" effect that may otherwise occur when the user is situated where the PZT signal coverage is poor, and the device is constantly losing and gaining the communication link with the PZT. The objective is to avoid the situation where the user is repeatedly presented with politeness requests. This situation can also arise if the user is simply entering and exiting repeatedly within a short period of time. The delayed-lock out is one method to achieve this objective. Another method is to compare the ID of the just found PZ with the ID of the previously locked-on PZ. If they are identical, the device will not enable politeness mode. The device can still have the politeness enabled according to the delayed lock-out technique. If it is disabled, the device may enable the politeness mode without any indication to the user if the user previously has accepted the enabling of the politeness request. It should be noted that for embodiments that use a positioner to determine whether a device is in a PZ, the Ping-Pong effect is less of an issue.

Even if all the techniques described above are applied, a user standing still in the vicinity of a PZ may have their communication device alerting means unwillingly and unintentionally effected. It should however be noted that the presence of a PZT signal does not imply that the request necessarily must be granted. How the communication device reacts to the presence of a PZT signal is determined by the programming of the PCP. The programming of the PCP may be under the control of the user, the device manufacture, the wireless (long-range) operator through the programming of the device prior to it being sold to the user, or any combination of these three entities. The PCP may be programmed such that it presents a request to the user that the user must acknowledge before any change to the operation of the device takes effect. If the user does not honor the request, the communication device would store the identity of the PZ, which can be an alphanumeric identifier or a name augmented by a alphanumeric identifier in such a way that the likelihood of two different PZ having the same identifier is very low.

In one embodiment, if the user walks from one PZT to another, with or without having lost the communication link with the first PZT, and the same identifier is sent by the second PZT, then the device will maintain its current status. In other words, if politeness mode is enabled, it will stay enabled. But if politeness mode is disabled, then it will stay disabled. Therefore, in one embodiment, after a predetermined time according to the PCP, the communication device may delete the identity of the PZ from its memory in order to limit the memory requirement of the device.

In another embodiment, the PZ system is integrated with a wireless office communication system, which is installed, for example, for wireless telephony. In such a system, the politeness request signal can be embedded in the transmitted signal form the wireless office system, e.g., on a control channel used by the wireless office system. There are various methods for deploying a wireless office system. In one embodiment, there are rather few, high powered transmitters positioned throughout the office environment. In this case, there may be a problem limiting the PZ to the intended area, because the transmitter will cover a broad area, such as a whole auditorium or office floor. Therefore, communication devices outside the intended area will receive the politeness request. As a result, the technique of using a positioner in the device arid coordinates from in the politeness zone request is a convenient way to limit the PZ to the intended area.

Again, an alternative is for politeness mode to be enforced as long as the communications device is "locked-on" to a control channel belonging to the wireless office communication system. In this case, however, specific meeting rooms or areas cannot be isolated for purposes of imposing a PZ. In this type of embodiment, the specific PZ level is not required; the device can simply be programmed, through a PCP for example, so that whenever it is locked on to a control channel with a politeness request embedded in the signaling, the device enters a pre-programmed PZ level.

Another way to implement a wireless office is to use many low power transmitters throughout the office environment. In this type of system, there is a higher likelihood of having a match between the transmitter range and the intended PZ coverage. In this case, communication devices with positioners would not be required. For example, if the wireless office communication system is using Bluetooth™ transmitters, the politeness zone requirements as to precision of coverage should be easy to meet, since Bluetooth™ technology provides a low power, short-range solution. Therefore, the same Bluetooth™ transmitters used to provide coverage for telephony in the wireless office communication system can include politeness requests with a fairly good match in radio-coverage area between the telephony requirements and the PZ requirements.

A PZ system can also be integrated into other limited area, wireless telephony systems, such as cordless systems or Wireless Local Area Networks (WLANs). Many of the same issues regarding coverage area and precision will also apply; however, similar approaches as the ones discussed can be used to overcome these issues.

While preferred embodiments and implementations of the inventive concepts presented herein have been shown and described, it will be apparent that many more embodiments and implementations are within the scope of the invention. Accordingly, the invention is not to be restricted, except in light of the claims and their equivalents.

What is claimed is:

1. A communication device, comprising: a first receiver configured to receive incoming communications over a first communication channel; an alerting mechanism configured to indicate receipt of an incoming communication over the first communication channel, the alerting mechanism configured for operation in a non-politeness mode and in a politeness mode; and a second receiver configured to receive politeness requests over a second communication channel, the politeness requests indicating that operation of the alerting mechanism should be set to politeness mode, wherein, upon receipt of a politeness request over the second communication channel, the device is configured to accept the politeness request and set operation of the alerting mechanism to politeness mode, or to reject the politeness request and leave operation of the alerting mechanism in its present mode of operation.

2. The communication device of claim 1, further comprising a programmable politeness control profile (PCP), wherein a politeness request is accepted or rejected based on information contained in the politeness request and on information programmed into the PCP.

3. The communication device of claim 2, wherein the PCP may be programmed through a man-machine-interface (MMI) included in the communication device, over the first communication channel, or both.

4. The communication device of claim 2, further comprising a removable storage medium, wherein the PCP is stored on the removable storage medium.

5. The communication device of claim 2, wherein the programming of the PCP can be overridden.

6. The communication device of claim 1, wherein the alerting mechanism, when operating in politeness mode, is configured to activate a selected one of a plurality of notification means upon receipt of an incoming communication over the first communication channel, wherein the notification means is selected based upon one or more of the following: a source of the received incoming communication, a time of day, initiation of a certain event, a day of the week, a type of received politeness request, a calling line identifier associated with the received incoming communication, input from a man-machine-interface (MMI) included in the communication device, and default settings programmed into a programmable politeness control profile (PCP) included in the device.

7. The communication device of claim 1, wherein the politeness request is accepted or rejected based on one or more of the following: a source of the received incoming communication, a time of day, initiation of a certain event, a day of the week, a type of received politeness request, a calling line identifier associated with the received incoming communication, input from a man-machine-interface (MMI) included in the communication device, and default settings programmed into a programmable politeness control profile (PCP) included in the device.

8. The communication device of claim 1, further comprising a positioner, wherein the politeness request is accepted or rejected based at least in part on location information provided by the positioner when the politeness request is received.

9. The communication device of claim 8, wherein the communication device is configured to modify the frequency with which the positioner supplies location information based on the distance relative to the position of the communication device when the politeness request was received.

10. The communication device of claim 8, wherein the communication device is configured to modify the frequency with which the positioner supplies location information based on the rate that the position of the communication device is changing.

11. The communication device of claim 8, further comprising a database configured to store locations of one or more politeness zones, wherein the location information provided by the positioner is used to verify the location of a politeness zone upon receipt of a politeness request.

12. The communication device of claim 11, wherein the politeness request is rejected if the location information does not correspond to one of the locations stored in the database, unless the rejection is otherwise overridden.

13. The communication device of claim 12, further comprising a programmable politeness control profile (PCP), wherein the PCP is programmed to add the location of the politeness zone to the locations stored in the database if the rejection is overridden.

14. The communication device of claim 1, further comprising a PZ timer and a positioner, wherein the communication device is configured to activate the PZ timer and enter a politeness mode when the politeness request is received, and wherein the communication device is configured to use location information provided by the positioner when the PZ timer elapses to determine whether to remain in politeness mode.

15. The communication device of claim 1, wherein the communication device is configured to indicate a status related to a received politeness request using at least one of the following: a display, a ringer, a buzzer, a speaker, a vibrator, and a visual indicator.

16. The communication device of claim 15, further comprising an antenna, the antenna including the visual indicator.

17. The communication device of claim 1, further comprising a politeness zone (PZ) ON timer, wherein the communication device is configured to activate the PZ ON timer when the communication device receives a politeness request and to delay accepting or rejecting the politeness request for a period of the PZ ON timer.

18. The communication device of claim 17, further comprising a display, wherein the period of the PZ ON timer is displayed on the display.

19. The communication device of claim 17, wherein the communication device provides an alert when the PZ ON timer is about to elapse.

20. The communication device of claim 17, wherein the communication device is configured to allow the period of the PZ OFF timer to be modified or disabled.

21. The communication device of claim 1, further comprising a politeness zone (PZ) OFF timer, wherein if the alerting mechanism is set to politeness mode, the communication device is configured to activate the PZ OFF timer before setting the alerting mechanism to a non-politeness mode for a period of the PZ OFF timer.

22. The communication device of claim 21, further comprising a display, wherein the period of the PZ OFF timer is displayed on the display.

23. The communication device of claim 21, wherein the communication device provides an alert when the PZ OFF timer is about to elapse.

24. The communication device of claim 21, wherein the communication device is configured to allow the period of the PZ OFF timer to be modified or disabled.

25. The communication device of claim 1, wherein the politeness requests include a request for one of a plurality of politeness levels.

26. A communication system, comprising: a politeness zone (PZ); a wireless communication device configured to receive incoming communications over a first communication channel and politeness requests over a second communication channel, the communication device comprising an alerting mechanism configured to indicate receipt of an incoming communication over the first communication channel, the alerting mechanism operable in a politeness mode and a non-politeness mode, the politeness requests indicating that operation of the alerting mechanism should be set to politeness mode, wherein, upon receipt of a politeness request over the second communication channel, the device is configured to accept the politeness request and set operation of the alerting mechanism to politeness mode, or to reject the politeness request and leave operation of the alerting mechanism in its present mode of operation; and a politeness zone transmitter (PZT) configured to send politeness requests to the communication device over the second communication channel when the communication device is proximate the PZ.

27. The communication system of claim 26, wherein the politeness requests include a request for one of a plurality of politeness levels.

28. The communication system of claim 27, wherein the plurality of politeness levels comprise a first level indicating that all incoming communications over the first communication channel be disabled, a second level indicating that all incoming communications over the first communication channel be avoided, and a third level indicating that incoming communications over the first communication channel be limited.

29. The communication system of claim 26, wherein transmission, acceptance, or both, of a politeness request is based on one or more of time of day, day of the week, and initiation or a certain event.

30. The communication system of claim 26, wherein the PZT is programmable using one or more one of the following: a console included in the PZT, an external device connected to the PZT through a communication port, and an external device interface to the PZT over the first or second communication channel.

31. The communication system of claim 30, wherein the PZT can be programmed with one or more of the following fields: a desired politeness level for the politeness zone, a time of day for transmitting politeness requests, a day of the week for transmitting politeness requests, a schedule of operation, a schedule of operation, a timer value or values, and a certificate from a certificate authority.

32. The communication system of claim 31, wherein the desired politeness level, the schedule for operation, or both, are dynamic and depend on day of week, time of day, or both.

33. The communication system of claim 26, wherein the politeness requests include attributes of the PZ.

34. The communication system of claim 26, wherein the attributes of the PZ include one or more of the following: area of the PZ, location of the PZ, defined entry and exit points for the PZ, identification of the PZ, the type of PZ, and a verification key for the PZ.

35. The communication system of claim 34, wherein the type of PZ includes or more of the following: restaurant, cinema, public transportation, library, school, hospital, office, and meeting room.

36. The communication system of claim 26, wherein the communication device is configured to send a response to the politeness request over the second communication channel, and wherein the PZT is configured to send acknowledgements of successful politeness requests to the communication device over the second communication channel.

37. The communication system of claim 26, wherein the PZ is configured to maintain a log of events related to politeness requests.

38. The communication system of claim 26, wherein the PZ comprises distinct entry and exit points, the system comprising a plurality of PZTs, with at least one PZT located at each of the respective entry and exit points, each PZT located at an entry point configured to send a politeness request and a log-in message to each communication device that enters the PZ, and each PZT located at an exit point configured to send a logout message over the second communication channel to each communication device that exits the politeness zone.

39. The communication system of claim 26, wherein the PZT transmits the politeness requests by establishing a communication link with the communication device over the second communication channel, by broadcasting the politeness request over the second communication channel.

40. The communication system of claim 39, wherein the communication device initiates a timer if a communication link with the PZT is broken off, or if the communication device is no longer able to receive the broadcast from the PZT, and wherein the communication device is configured to set its alerting mechanism to a non-politeness mode unless the communication link with the PZT is re-established or the broadcast from the PZT received before the timer expires.

41. The communication system of claim 40, wherein the PZT transmits a timer period to the communication device.

42. The communication system of claim 40, wherein the communication device is configured to allow the timer period to be modified, or the timer to be disabled.

* * * * *

UNITED STATES PATENT AND TRADEMARK OFFICE
CERTIFICATE OF CORRECTION

| | |
|---|---|
| PATENT NO. | : 6,898,445 B2 |
| APPLICATION NO. | : 09/738943 |
| DATED | : May 24, 2005 |
| INVENTOR(S) | : Slettengren et al. |

It is certified that error appears in the above-identified patent and that said Letters Patent is hereby corrected as shown below:

On the Title Page, item (56), under "OTHER PUBLICATIONS", in Column 2, Line 1, above "Boraks, David, "BlueLinx aims to end mobile phone" insert -- Proudler, Graeme; "Automatically Disabling Mobile Communications Devices in Sensitive Locations," Research Disclosure, Kenneth Mason Publications, no. 391, 1 November 1996, pp. 729. --.

On Page 2, item (56), under "OTHER PUBLICATIONS", in Column 1, Line 7, delete "Stateholder" and insert -- Stakeholder --, therefor.

On Page 2, item (56), under "OTHER PUBLICATIONS", in Column 1, Lines 9-10, delete "Demostration" and insert -- Demonstration --, therefor.

On Page 2, item (56), under "OTHER PUBLICATIONS", in Column 2, Line 10, delete "CIWINNT" and insert -- CI/WINNT --, therefor.

In Column 1, Line 41, delete "wold" and insert -- would --, therefor.

In Column 5, Line 11, delete "1100" and insert -- 100 --, therefor.

In Column 9, Line 27, delete "(luring" and insert -- during --, therefor.

In Column 14, Line 7 delete "embodiment, The" and insert -- embodiment, the --, therefor.

In Column 15, Line 60, delete "Also, The" and insert -- Also, the --. therefor.

In Column 20, Line 21, delete "arid" and insert -- and --, therefor.

UNITED STATES PATENT AND TRADEMARK OFFICE
CERTIFICATE OF CORRECTION

PATENT NO. : 6,898,445 B2
APPLICATION NO. : 09/738943
DATED : May 24, 2005
INVENTOR(S) : Slettengren et al.

It is certified that error appears in the above-identified patent and that said Letters Patent is hereby corrected as shown below:

In Column 23, Line 38, in Claim 31, after "operation," delete "a schedule of operation.".

In Column 24, Line 5, in Claim 35, after "includes" insert -- one --.

Signed and Sealed this

Fifteenth Day of April, 2008

JON W. DUDAS
*Director of the United States Patent and Trademark Office*